Jan. 20, 1959

R. R. GRINSTEAD 2,869,980

PROCESS FOR THE RECOVERY OF METALS FROM
HIGH-LIME CARNOTITE ORES

Filed Aug. 9, 1955

INVENTOR.
ROBERT R. GRINSTEAD
BY
ATTORNEY.

INVENTOR.
ROBERT R. GRINSTEAD
BY
ATTORNEY.

INVENTOR.
ROBERT R. GRINSTEAD
BY
ATTORNEY.

INVENTOR.
ROBERT R. GRINSTEAD
BY
*Roland A. Anderson*
ATTORNEY.

United States Patent Office 2,869,980
Patented Jan. 20, 1959

2,869,980

PROCESS FOR THE RECOVERY OF METALS FROM HIGH-LIME CARNOTITE ORES

Robert R. Grinstead, Concord, Calif., assignor, by mesne assignments, to the United States of America as represented by the United States Atomic Energy Commission Application August 9, 1955, Serial No. 527,429

26 Claims. (Cl. 23—14.5)

The present invention relates to a slurry solvent leaching method for recovering metals from solid materials and, more particularly, to an improved solvent leaching method for recovering uranium from high-lime carnotite ore.

A slurry solvent extraction process for recovering metal values from solid materials utilizing an alkyl phosphatic extractant dissolved in an organic diluent is disclosed in the application of Robert R. Grinstead, filed concurrently herewith as of the date of August 9, 1955, Serial No. 527,428, and entitled "Slurry Solvent Extraction Process for the Recovery of Metals From Solid Materials." The use of such alkyl phosphatic extractants, i. e., alkyl phosphates, pyrophosphates, phosphites, and phosphonates for recovering metals from various solutions including phosphoric acid is disclosed and claimed in the copending application of Richard H. Bailes and Ray S. Long, Serial No. 335,276, filed February 3, 1953, and in the application of Ray S. Long, Serial No. 491,798, filed March 2, 1955.

Generally speaking, these latter-mentioned processes involve operations such as mechanical and preliminary preparation of the ore or other solid material, leaching and separation of the leach solution from the ore or otherwise obtaining a solution of the metal value, optional preliminary conditioning of the leach solution and then solvent extraction of the desired materials from the leach solution followed by recovery of the desired materials from the extract. These processes have been found very useful in the recovery and purification of metal values from aqueous solutions derived from a wide variety of source materials.

In the aforementioned slurry solvent extraction method the extractant phase is contacted with the solid source materials under aqueous conditions, i. e., in the presence of a discrete acidic aqueous phase forming slurried admixtures, whereby the desired metal is first leached into the aqueous phase and then extracted into the organic extractant phase, the solvent extract phase is then separated from the solid and aqueous phase and the metal value is subsequently recovered from the extract. As may be noted, the slurry solvent extraction process mentioned in the foregoing utilizes extractive conditions in which there is present a discrete acidic aqueous phase wherein the acid content is sufficient to react substantially completely with all reactable materials in the ore, i. e., the extraction of metal values from the ore is performed with the aqueous phase conditions being quite similar to those employed in a normal aqueous leaching system. Such solvent extraction may therefore be said to be conducted under "aqueous" conditions.

Now it has been discovered that great savings in reagents and other advantages can be obtained by directly leaching uranium from certain high-lime content uranium ores, particularly high-lime carnotite ores with an organic phase of similar composition to those employed in the above-mentioned applications in the presence of certain mineral acid solubilizing agents and under "nonaqueous" conditions. Accordingly, relevant to the present disclosure, it is appropriate to refer to such organic phase as an organic leaching phase which includes an alkyl phosphatic leaching agent and an organic solvent-diluent.

As employed herein, the term "nonaqueous" is not considered to be limited to strictly anhydrous conditions alone, but is intended to include those systems in which the amount of water is limited so as to obtain the beneficial results of the invention as are believed apparent from context of the disclosure. Usually the amount of water will be limited by employing low water content ore, concentrated acidic solubilizing agents and low water content extractant phases. Using such procedures efficient uranium recoveries are obtained while only a small proportion of the basic materials in the ore react with the acid necessary for the uranium recovery. Remarkable savings in acid and other reagents are thereby obtained and facilitated manipulative procedures are also provided as disclosed hereinafter.

It is therefore an object of the invention to provide a solvent leaching process for the separation and recovery of metallic values in which an organic leaching phase is contacted directly in slurried admixture with a solid material to leach the metal value therefrom.

Another object of the invention is to provide a solvent leaching process for recovering uranium from a high-lime carnotite ore in which an organic alkyl phosphatic leaching phase is contacted directly with the ore under nonaqueous conditions.

Another object of the invention is to provide a solvent leaching process for recovering uranium from high-lime carnotite ores wherein the ore is treated with concentrated acid and then is contacted directly with an alkyl phosphatic leaching phase under limited moisture conditions to selectively dissolve the uranium therefrom.

Still another object of the invention is to provide a solvent leaching process wherein an alkyl phosphatic leach phase is slurried with a high-lime carnotite ore in the presence of mineral acid under nonaqueous conditions to selectively leach the uranium therefrom.

One other object of the invention is to provide a solvent leaching process for the separation and recovery of uranium values in which an organic leaching phase in admixture with other reagents is contacted with finely-divided high-lime carnotite ore under limited moisture conditions to selectively leach the uranium values therein and the leach solution is then separated from the solids of the mixture.

A further object of the invention is to provide a process in which a solvent phase comprising a leaching agent selected from the group consisting of alkyl phosphates, alkyl pyrophosphates, alkyl phosphites, and alkyl phosphonates dissolved in an organic diluent is contacted with a finely-divided high-lime carnotite ore under nonaqueous acidic conditions to leach uranium therefrom and the uranium is later recovered from the leach solution.

Other objects and advantages of the invention will become apparent by consideration of the following description taken in conjunction with the accompanying drawings, of which:

Figure 5:
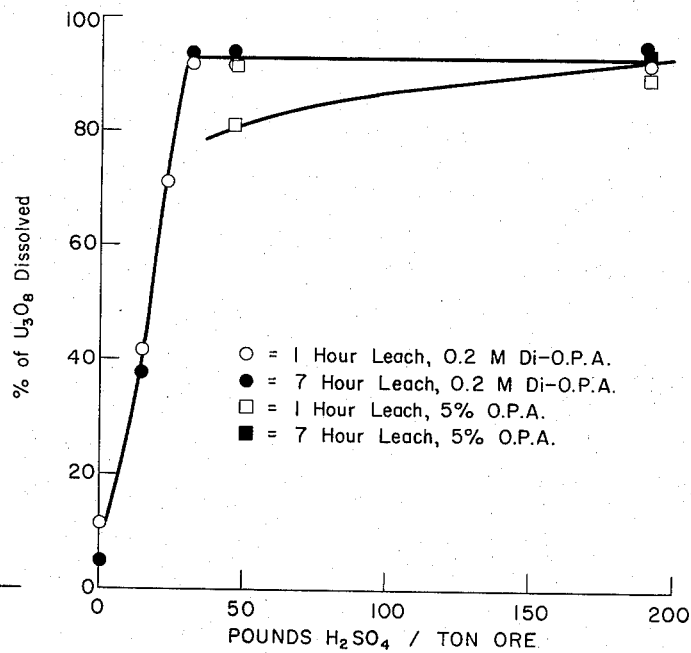
Figure 5:
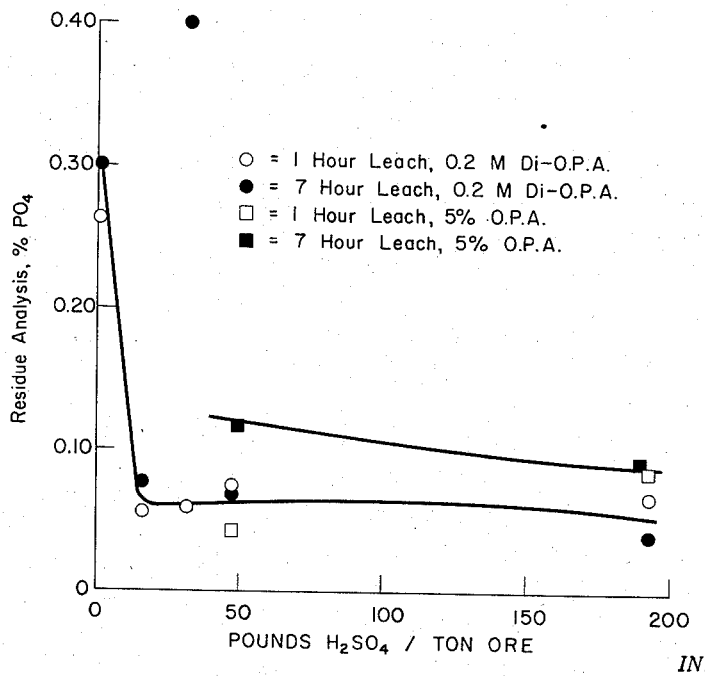
Figure 6:
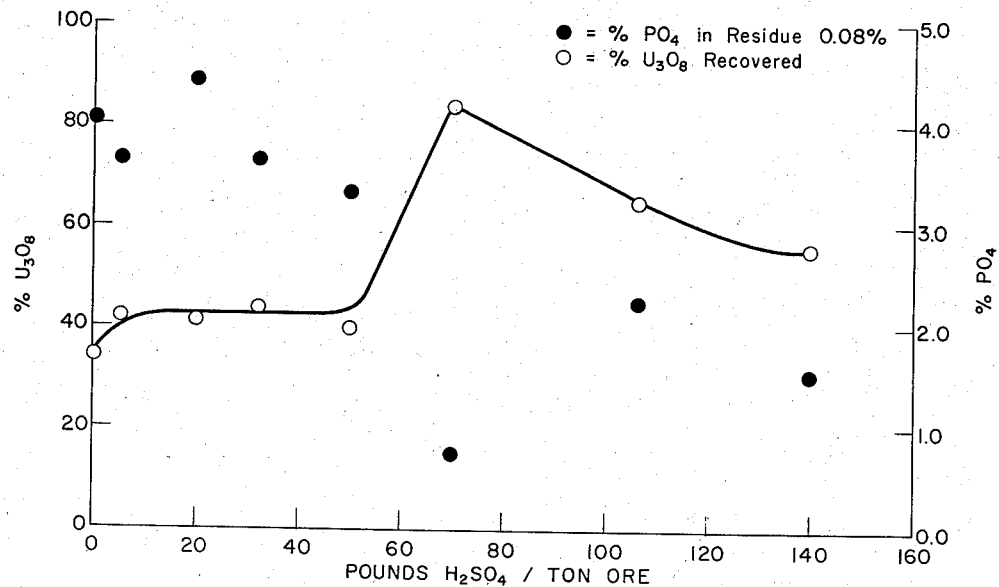
Figure 7:
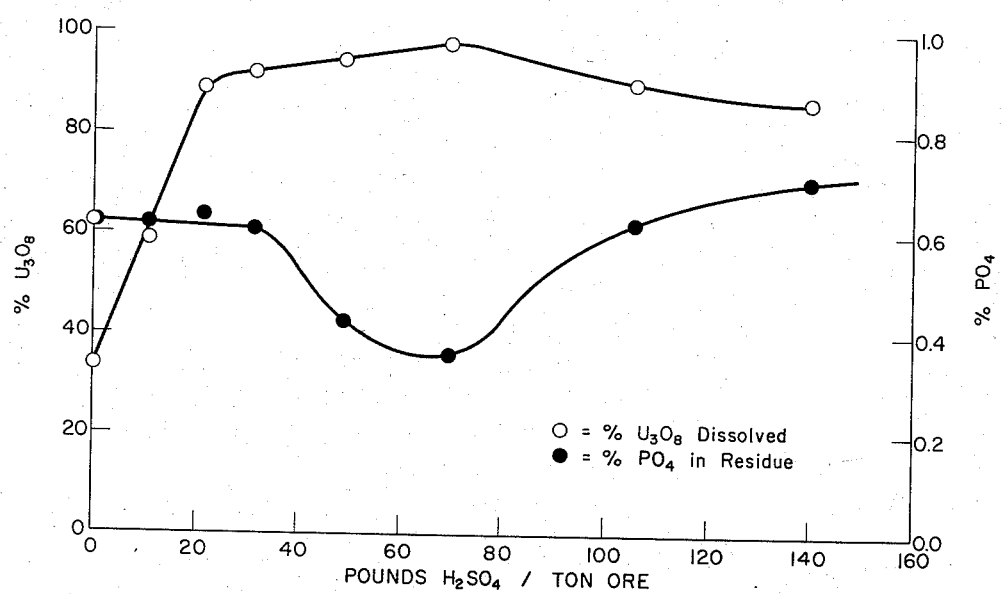
Figure 8:
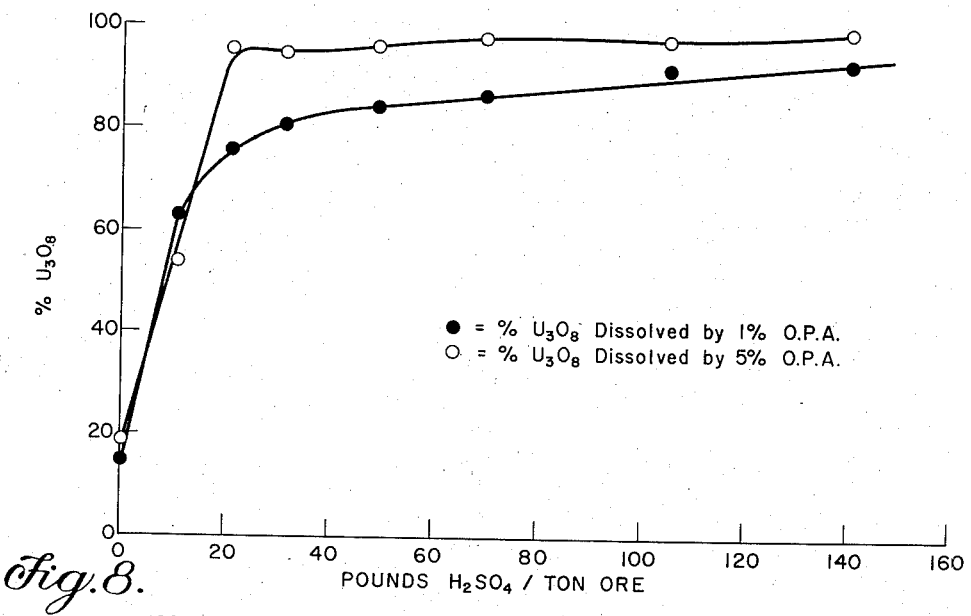
Figure 9:
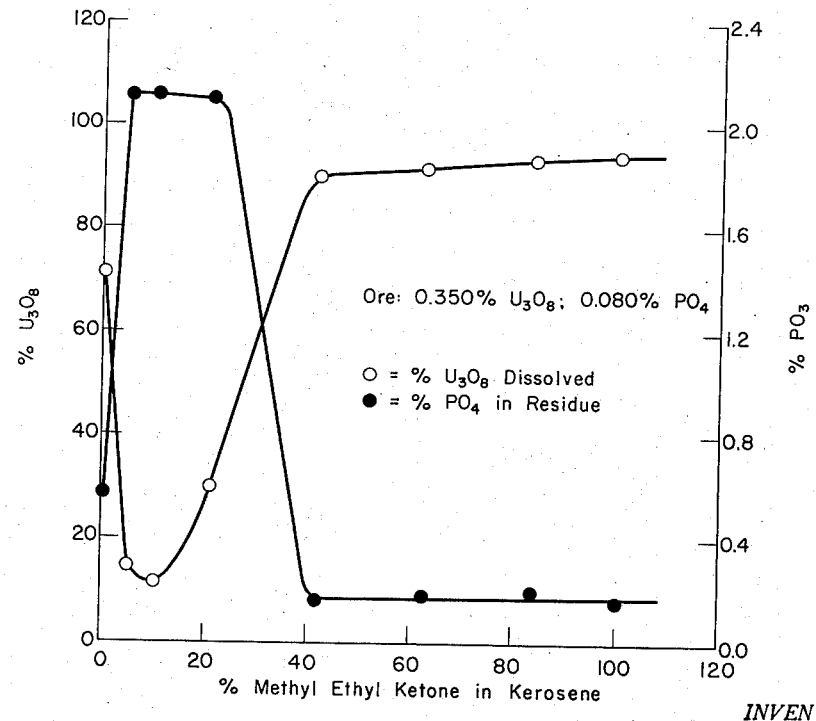
Figure 10:
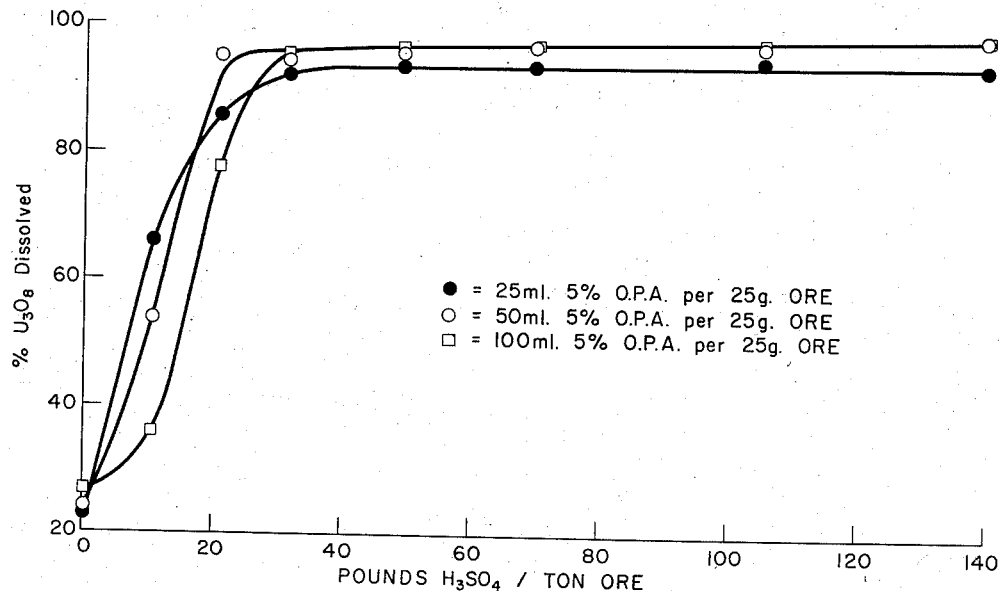
Figure 11:
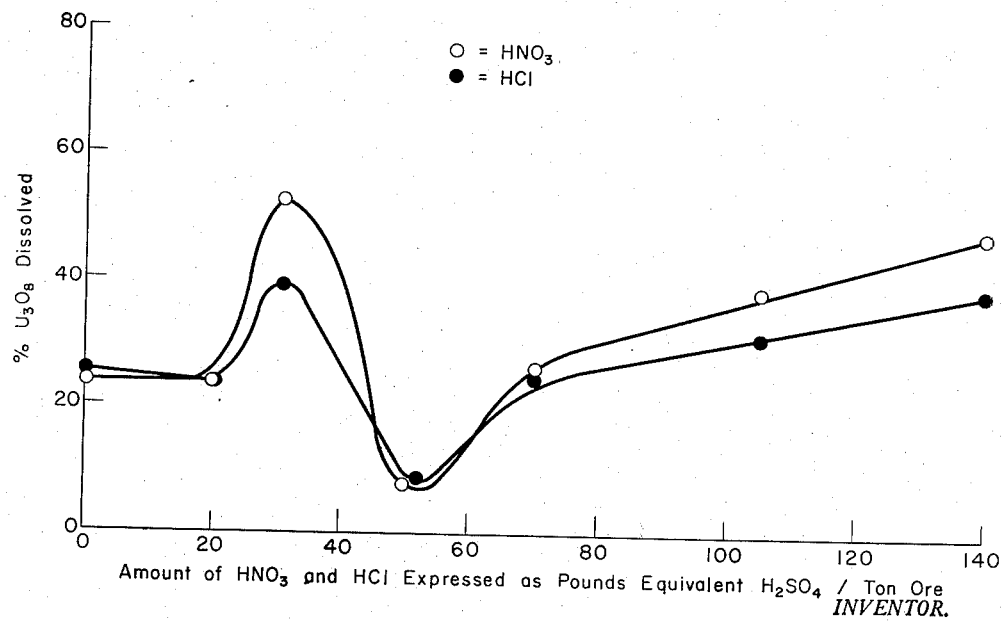
Figure 12:
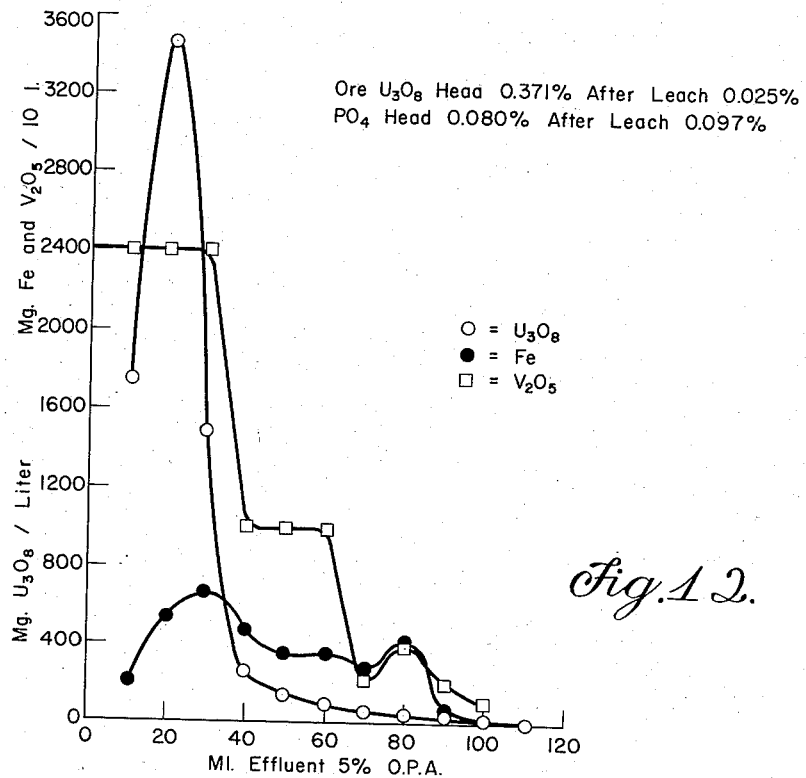
Figure 13:
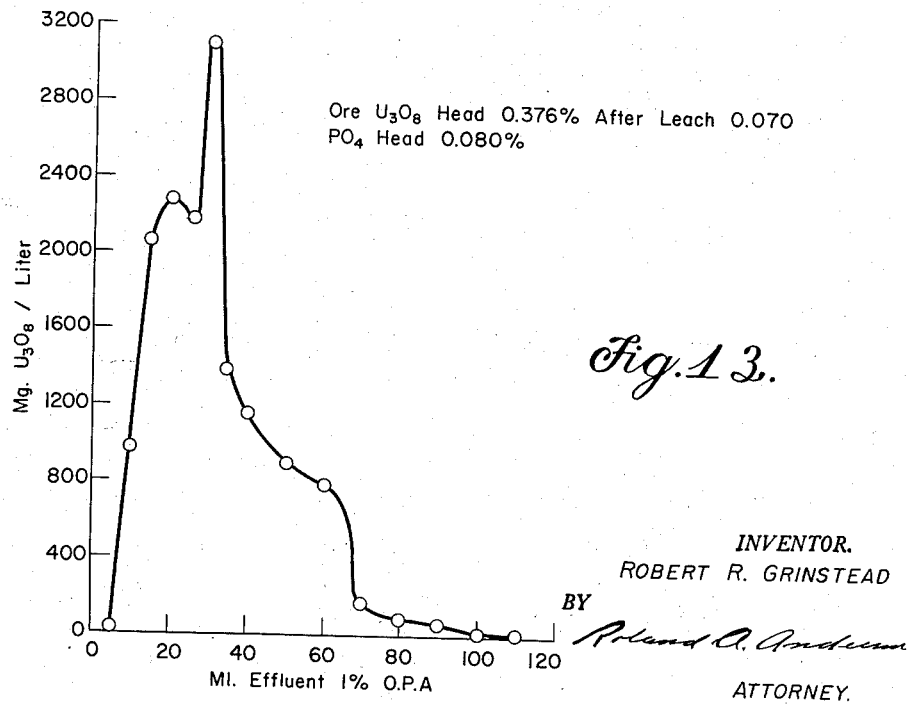

Figure 5 portion (A) is a graphical representation of uranium recoveries and portion (B) is a graphical representation of leaching agent losses with variations in acid consumption and leaching times for O. P. A. and di-O. P. A. leaching agents;

Figure 6 is a graphical illustration of the recovery of uranium and extractant loss in treating a carnotite ore with n-propyl orthophosphoric acid in isopropyl ether diluent as a function of acid consumption;

Figure 7 is a graphical portrayal of the recovery of uranium from a carnotite ore and leaching agent loss with an octyl pyrophosphoric acid leaching agent in isopropyl ether diluent as a function of acid consumption;

Figure 8 is a graphical illustration of the recovery of uranium from a carnotite ore with two concentrations of octyl phosphoric acid leaching agent in methyl ethyl ketone as a function of acid consumption;

Figure 9 is a graphical illustration of the recovery of uranium and leaching agent loss from a carnotite ore using octyl phosphoric acid leaching agent in a mixed, kerosene-methyl ethyl ketone diluent, with a fixed acid consumption;

Figure 10 is a graphical illustration of the recovery of uranium and loss of octyl phosphoric acid leaching agent in methyl ethyl ketone diluent at various phase ratios and as a function of acid consumption in the treatment of a carnotite ore;

Figure 11 is a graphical illustration of the uranium recovery obtained with $HNO_3$ and $HCl$ in amounts corresponding to the $H_2SO_4$ equivalent/ton of carnotite ore;

Figure 12 is a graphical representation of the extraction of certain metal values utilizing a percolation leach of carnotite ore with a leach phase of octyl phosphoric acid in methyl ethyl ketone; and Figure 13 is a graphical illustration of uranium recovered in a percolation leach of carnotite ore utilizing a low concentration of octyl phosphoric acid in methyl ethyl ketone.

High-lime carnotite ores occur at various locations on the Colorado Plateau and present a difficult uranium recovery problem since high acid consumption required in conventional processes make recovery of low uranium content uneconomic. Carnotite ore from the Lukachukai district of the Colorado Plateau is typical of such high-lime carnotites and an analysis of such an ore is presented hereinafter. The high calcium content, which is present mainly as calcium carbonate, is the basis of the terminology "high-lime" conventionally applied thereto. In high-lime ores, the calcium content may vary below and above that shown. While the process of the invention has been practiced extensively with such materials, it is believed that the teachings may apply to the recovery of uranium from other high calcium content materials and to the recovery of other metal values in view of certain considerations noted hereinafter.

LUKACHUKAI ORE ANALYSIS

| Constituent: | Percent by wt. |
|---|---|
| $U_3O_8$ | 0.41 |
| $V_2O_5$ | 1.10 |
| $Fe_2O_3$ | 1.66 |
| $Al_2O_3$ | 4.2 |
| CaO | 7.30 |
| $SiO_2$ | 75.3 |
| $P_2O_5$ | 0.04 |
| $SO_3$ | Not detected |
| $TiO_2$ | 0.18 |
| MgO | 0.92 |

In essence, the process of the invention involves reduction of such an ore to a comminuted form appropriate to form a slurry. Low moisture content acidic solubilizing agents and a fluid organic leaching phase including a solvent-diluent and an alkyl phosphatic leaching agent are then admixed with the solid to form a nonaqueous slurry therewith, according to varied procedures, resulting in leaching of the desired metal value into the organic value into the organic phase with the assistance of the solubilizing agent. Subsequently, the leach phase is separated from the solid material and the metal value is recovered therefrom by a variety of different procedures.

More particularly, the ore or other solid material is pulverized to provide the comminuted form required for slurrying and to assure adequate contact with the organic leaching reagent phase. Preliminary roasting or drying treatments may be found to facilitate recovery with certain ores as eliminating excessive moisture and providing more accessible metal values. A major portion of the experimental data disclosed herein was obtained with material having the aforementioned composition and the following sieve analysis:

SIEVE ANALYSIS OF LUKACHUKAI ORE

| Mesh Fraction | Percent of Ore | $V_2O_5$ | | $U_3O_8$ | |
|---|---|---|---|---|---|
| | | Analysis, Percent | Distribution, Percent | Analysis, Percent | Distribution, Percent |
| >50 | 7.0 | 0.96 | 15.7 | 0.31 | 11.5 |
| <50 >60 | 3.3 | 0.76 | 26.3 | 0.24 | 18.9 |
| <60 >100 | 28.9 | 0.60 | 2.4 | 0.21 | 1.9 |
| <100 >150 | 28.5 | 0.67 | 2.7 | 0.21 | 2.0 |
| <150 >200 | 12.0 | 0.90 | 8.6 | 0.39 | 8.6 |
| <200 >270 | 6.5 | 1.17 | 20.6 | 0.68 | 27.5 |
| <270 | 12.0 | 2.49 | 23.7 | 1.34 | 29.6 |
| | 98.2 | | 100.0 | | 100.0 |

<=smaller than.
>=greater than.

Various sequences may be followed in forming the slurried admixtures. The prepared ore may be admixed with the acidic solubilizing agent and allowed to digest for varying periods and then the leaching phase is added to the slurried admixture usually with mechanical agitation. Preferably, the leaching phase is added simultaneously with the acidic solubilizing agent or just shortly subsequently as increased uranium recoveries and lower reagent losses are thereby obtained. With high-lime materials, such as the carnotite ore described above, the solubilizing agent will generally comprise concentrated sulfuric acid, preferably while nitric and hydrochloric acid in the concentrated forms may also be employed. Oxidizing and reducing agents may be included to assist in dissolution or provision of appropriate oxidation states with other metal values as should be apparent from consideration noted hereinafter.

The Lukachukai ore, supra, requires at least about 280 lbs. of $H_2SO_4$ per ton added to an aqueous slurry of 30% solids, as disclosed in one of the aforesaid copending applications, to leach all of the extractable uranium with the final pH reaching a value of below about 1.4. This would also be the amount required if a normal aqueous acidic leach were employed.

Figure 1:
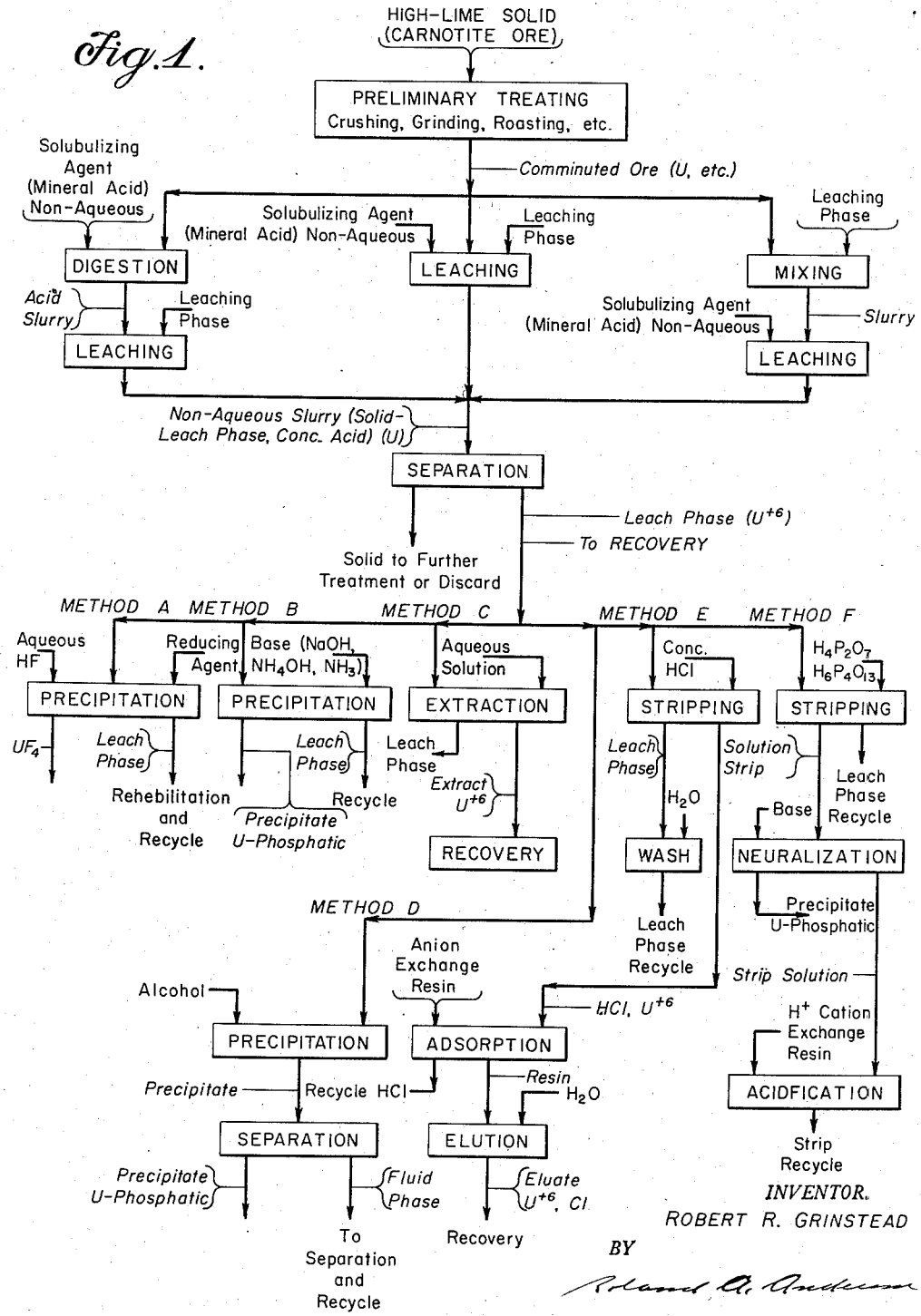
Figure 1 is a flow sheet illustrating the process of the invention.
Figure 2:
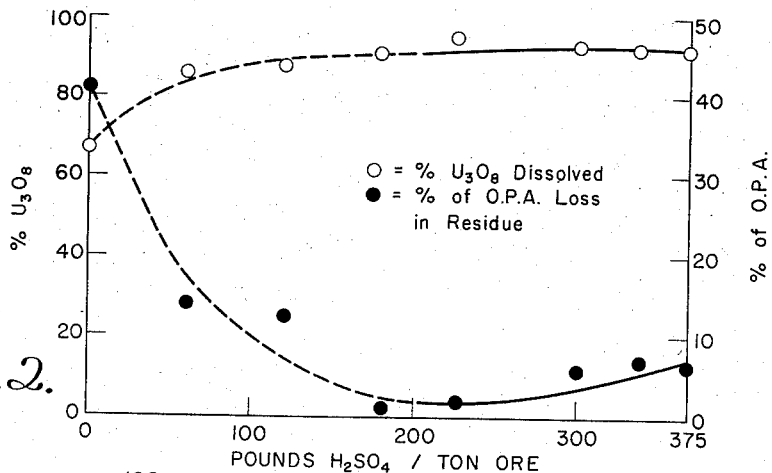
Figure 2 is a graphical illustration of $H_2SO_4$ consumption and leaching agent loss in uranium recovery operations performed in accordance with the invention.

By comparison, direct leaching of the ore using the extractants and under the nonaqueous conditions of the invention dramatically reduces the amount of acid required for essentially complete recovery of the uranium. For example, 50 ml. of octyl phosphoric acid (O. P. A.) in kerosene was used to leach the uranium from a mixture of 25 g. of the above ore mixed with various quantities of $H_2SO_4$ (added as 96% $H_2SO_4$ to limit the amount of water). The amounts of acid used formed either pasty or damp mixtures. The slurried mixture was shaken for 16 hours and then filtered. Filtrates were analyzed for uranium and the residue ignited and analyzed for phosphate to indicate extractant loss into the residue with the results illustrated in Fig. 2 of the drawing. With the lower amounts of $H_2SO_4$, corresponding to the dashed portions of the curves, the residues were not washed with kerosene. Since about 10% of the extractant phase was retained by the solid phase the indicated uranium recoveries in this region and extractant losses are somewhat too high. Neglecting these, it can be seen that only small amounts, i. e., about 60 lbs. $H_2SO_4$/ton of ore, of $H_2SO_4$ are required to give 90% uranium recovery. Some contribution of acid is obtained from the leaching agent since they are acidic substances. However, even considering this acidity a remarkable saving is still obtained as shown in the following tabulation of the relation between the amount of $H_2SO_4$ used and maximum acidity actually available. These results are considered merely illustrative and not the maximum obtainable as may be seen from other portions of the disclosure.

| Pounds $H_2SO_4$/Ton of Ore in Leach | Total Acidity Calculated as lb. $H_2SO_4$/Ton of Ore |
| --- | --- |
| 0 | 80 |
| 60 | 110 |
| 120 | 160 |
| 180 | 210 |

The leaching phase will generally include a diluent or solvent and as an essential component there must always be present an alkyl phosphatic leaching agent of the classes including alkyl orthophosphoric acids, alkyl pyrophosphoric acids, alkyl phosphites, and alkyl phosphonates of the character disclosed in the aforementioned copending applications. In general, the aliphatic alkyl derivatives have been found satisfactory; however, cycloalkyl and aromatic alcohol derivatives may be useful particularly to obtain desired solubility characteristics. Various factors govern the choice of the particular alkyl phosphatic leaching agent which is to be used. In practical processes, fluidity, tendency to form emulsions, stability, ease of preparation and other properties must be taken into account. The prime factor of importance, of course, is the ability of the leaching agent to leach, i. e., dissolve the desired metal into the organic phase. In practice alkyl derivatives of either o-phosphoric and pyrophosphoric acids, wherein the alkyl substituents are of a chain length between at least 1 to 10 carbon atoms in length and 4 to 17 carbon atoms, respectively, i. e., methyl to decyl substituted o-phosphoric acids and butyl to heptadecyl pyrophosphoric acids have been found especially useful for leaching uranium in the present process. Generally speaking, these classes of leaching reagents recover the uranium to a very high degree while reagent loss in the slurry residue may be reduced to easily tolerated levels by procedures disclosed herein. Solubility of the leaching agent in the aqueous phase noted especially with lower molecular weight substituents when used under the aqueous conditions of other processes present greatly decreased difficulty in the present process. In various descriptive portions of this application, the leaching agents will be identified by certain recognized abbreviations, e. g., octyl phosphoric acid is abbreviated as O. P. A., octyl pyrophosphoric acid as O. P. P. A., dioctyl phosphoric acid as di-O. P. A., etc.

An organic diluent is employed to facilitate contact of the leaching agent with the solid material and to provide other desirable operating characteristics. In the proportions that the leaching agent is employed in the process of the invention, the viscosity of the indicated agents would usually make contact with and separation from the solid material difficult and result in large losses.

In practice, certain oxygenated organic solvents characteristically yield the highest uranium recoveries. These oxygenated hydrocarbon solvents include ethers, typically represented by the lower boiling members such as methyl, ethyl, propyl, isopropyl, butyl and butyl isomers, and probably some of the higher members as well as the corresponding ketones, e. g., methyl ethyl ketone, methyl isobutyl ketone, and alcohols. Oxygenated naphthenic compounds corresponding to these materials may also yield similar results. Since excellent recoveries are also obtained with petroleum derived materials such as fluid aliphatic hydrocarbons, kerosenes, and gasolines and the cost thereof is low, these materials are usually preferred. Various other hydrocarbon solvents, e. g., Stoddard solvent, Sovasols, paint thinners, cleaning solvents, some aromatics such as benzene, xylene and toluene especially in admixtures, e. g., with ketones, are likewise quite useful. From the diverse nature of the materials indicated it will be understood that many other similar materials may also be employed. The leaching phase may be contacted in slurried fashion with the solid material in a variety of manipulative procedures including batch leaching, percolation leaching, countercurrent leaching including continuous operation, cascade leaching and other appropriate methods either with or without recycle of the leaching phase. High concentrations of the leaching agent in the leach phase, e. g., ca. 50% or more, are capable of dissolving high proportions of the uranium since the acidity of the agent when used alone and in large quantities is sufficient to dissolve the uranium. However, due to the high viscosity and other factors, processing is difficult and reagent cost is high. Therefore, appropriate amounts of mineral acid as suggested above and leaching agent concentration in the range of about 1 to 20%, yielding optimal overall results, are generally preferred. Leaching agent concentrations lower than 1% may be employed under certain circumstances and especially with the highly effective alkyl pyrophosphate leaching agents. The proportion of leaching agent will be influenced by many factors such as the procedural variation, nature of the diluent, relative leaching efficiency of the alkyl phosphatic leach agent (i. e., on a molar basis), amount of acid or other conditioning reagents employed, contacting conditions, condition of the ore and others, all of which conditions are interdependent to a greater or lesser degree considered to be apparent from the disclosure.

Solids content in the slurry may range from about 10 to above 70% volumetrically, i. e., the slurry may range from a small proportion of solid dispersed in the fluid phase to very viscous pasty consistencies. Following an appropriate contact time the phases are separated usually by decantation or filtering and, especially with the higher solids content slurries, occluded leach phase is washed from the residue with additional solvent. The preferred oxygenated hydrocarbon solvents are most easily separated in this operation. Residual solvent in the solid can be recovered by distillation; however, solvent loss is often negligible.

Characteristically, with low concentrations of leaching agent in the leach phase and particularly with high-lime ores, uranium leaching from the slurried ore is low or negligible with the leaching phase alone. With the addition of increasing amounts of the mineral acid in the presence of the organic leaching phase, leaching of the uranium increases rapidly to a maximum value and then usually remains fairly constant with further increases of acid. The position of the maxima with reference to acid consumption varies with the concentration of leaching agent in the organic phase and, to some extent, is dependent on the particular leaching agent and solvent combination employed. Sulfuric acid applied in substantially anhydrous form (96% acid) produces exceptionally good leaching recovery of the uranium and low reagent losses, provided very excessive amounts are not employed since the leaching agent is somewhat soluble in the acid. Nitric (70%) and hydrochloric (37%) acids exhibit somewhat similar behavior in increasing the uranium extraction although the peak extraction level is generally decidedly lower than with sulfuric acid, and a peculiar minimum sometimes occurs in plotted curves of the recovery data.

From a uranium ore of the character described, only the uranium and iron, presumably in the hexavalent and trivalent states respectively, are leached with high efficiency. Vanadium is extracted to a considerable degree; however, in the oxidation state in which it is present in these ores and with the leaching conditions contemplated herein, only a maximum of about 10–20% of the total vanadium appears during recovery of the uranium. With especially modified processes, i. e., proper treatment of the ore, higher proportions may be obtained in a process of the nature disclosed.

The behavior of various metal values with leaching agents employed herein follows certain general rules especially when extraction efficiencies from acidic or neutral aqueous phases are considered. While the relative leaching efficiencies for different classes of the leaching agents do not vary as widely in the present process as compared with the remarkable differences which are observed when the same materials are used in liquid-liquid extractions of the character described in said copending applications, the leachability of particular metal values as related to oxidation state, i. e., valence state, appears to follow generally similar rules. An apparent reason may concern the formation of similar metal value alkyl phosphatic compounds in either process and the similar solubility thereof in the organic phase.

In many of its aspects the present process most nearly resembles a leaching process although an organic phase, similar in composition to that obtained in liquid-liquid extraction, is obtained. Monovalent and divalent ions, e. g., $Na^+$, $K^+$, $Ca^{++}$, $Mg^{++}$, $Fe^{++}$, etc., usually are not dissolved to any appreciable extent. Trivalent ions such as $Fe^{+++}$, and those of the lanthanide and actinide series are considered extractable with appreciable efficiency while tetravalent ions such as $Th^{+4}$, $U^{+4}$ and other highly charged ions of the lanthanide and actinide elements are extracted with the highest efficiencies and it may be noted that tetravalent vanadium is extracted with greater efficiency than is pentavalent. Dipositive ions such as uranyl, $UO_2^{++}$ anomalously are extracted with excellent efficiency. Uranium, which is generally present in the hexavalent state, and other metal values can be recovered from the leach solution (filtrate) obtained in the foregoing by the following methods:

*Method A.—Reduction-precipitation with HF*

A leach solution obtained as described above may be treated for the recovery of uranium by contact with an aqueous phase containing HF in the presence of a reducing agent. Powdered iron, $FeSO_4$, or $Na_2S_2O_4$ reducing agents have been found satisfactory for this purpose. Low concentrations of HF, e. g., about 3 to 5%, and phase ratios of from about 5:1 to about 10:1, organic to aqueous, are sufficient to give essentially complete uranium recoveries. The organic phase may be recycled following rehabilitation and the aqueous precipitant phase recycled after separation from the precipitate. The product obtained is an impure uranium fluoride. This method may be expected to work with other lanthanide and actinide elements for which insoluble fluorides are formed, in some cases, not requiring the reducing agent provided the leached metal value is in the appropriate oxidation stage.

*Method B.—Basic precipitation*

Uranium can be precipitated from such a leach solution by neutralization with basic materials. For example, O. P. A.-ether leach solutions can be neutralized with excess NaOH in aqueous solution producing either a yellow precipitate or two phases with the uranium precipitated in the aqueous. Precipitated material is then separated from the phases and may be dried yielding an impure uranium phosphatic material. The impure material can be calcined to yield an impure inorganic uranium phosphate or treated by known methods to yield high purity uranium compounds.

*Method C.—Extraction of the uranium with aqueous reagent solutions*

Leach solutions prepared as described above may be contacted with various aqueous reagent solutions whereby the uranium is extracted into the aqueous solution and may be recovered therefrom. The uranium in the extracts is generally present in the hexavalent state and is extractable into aqueous solutions containing oxalic acid, $Na_4P_2O_7$ or $Na_6P_4O_{13}$. 0.5 M $H_2C_2O_4$ contacted with an O. P. A.-ether leach solution containing 5 grams $U_3O_8$ per liter extracted 40% of the uranium into the aqueous phase indicating that multistage countercurrent processes utilizing this reagent would be useful in recovering the uranium from the leach solution. Evaporation of the water from such an oxalic acid extract and calcination of the residue would yield an impure uranium oxide product. Precipitation methods, e. g., with ammonia, could also be employed to recover the uranium from such an oxalic acid extract.

Aqueous HF, in about 3 to 5% concentration, extracts the uranium from such an organic leach solution with almost the theoretical maximum efficiency and the distribution constants of hexavalent uranium into the aqueous phase at low levels, i. e., about 1 gram $U_3O_8$ per liter in 5% O. P. A. in ether, are about 9 for 3% HF and about 30 for 5% HF. Treatment of this aqueous extract with a reducing agent such as $Na_2S_2O_4$, Fe, $FeSO_4$, or other material precipitates uranous fluoride material from the aqueous extract.

Aqueous solutions of $Na_4P_2O_7$ or $Na_6P_4O_{13}$ of about 0.5 to 3% are very effective in removing the uranium from the leach solution. Neutralization of the inorganic aqueous pyrophosphate obtained in this manner, with base, precipitates an impure uranyl phosphatic material.

*Method D.—Precipitation with alcohol*

Methyl and ethyl alcohols added to O. P. P. A. leach phases, particularly those prepared with hydrocarbon solvents, precipitate uranium while isopropyl and higher alcohols do not. The alcohol apparently selectively extracts excess leaching agent from the organic phase and the uranium leaching agent compound precipitates as a third phase which is insoluble in either of the fluid phases and may be separated therefrom. Addition of water to the alcohol phase decreases the solubility of the leaching agent therein and the leaching agent can be extracted, e. g., with kerosene to form new leaching phase. The alcohol can then be separated from the water by distillation and reused.

*Method E.—Stripping with concentrated HCl*

The leaches obtained with alkyl o-phosphoric acid leach agents are especially amenable to stripping treatment with concentrated HCl to remove the uranium therefrom. HCl above about 8 M and especially above 10 M efficiently removes the uranium from such leaches by contact as in a Scheibel column. HCl which dissolves in the leach phase is easily removed by water washing. Uranium dissolved in the HCl can be recovered by contacting the HCl phase with a strongly basic anionic exchange resin such as Dowex-1 whereon the uranium is adsorbed as an anionic chloride complex and the acid reused. Subsequent elution with water yields a purified uranyl chloride solution from which fairly pure uranium products may be precipitated as with ammonia. Also the HCl can be distilled from the strip solution for reuse leaving the uranium as an impure residue.

Method F.—Stripping with acidified pyrophosphate salt solutions

Acidified solutions of pyrophosphate or polyphosphates extract uranium with great efficiency from the leach phases of the invention. Solutions obtained by acidifying either $Na_4P_2O_7$ or $Na_6P_4O_{13}$ with $H_2SO_4$ or $H_3PO_4$ are employed representatively in this method of stripping. Solutions of the unacidified salts employed as disclosed above tend to destroy the usefulness of the leaching phase on recycle while the present method does not.

The compounds formed in the acidification of the indicated materials are $H_4P_2O_7$ and $H_6P_4O_{13}$. Organic to aqueous phase ratios of the order of 20:1 to 1:2 have been found operable under various conditions. Aqueous solutions of the phosphate stripping agents which have been acidified to pH values ranging about 1 and below and of various concentrations below saturation dependent on extraction conditions have been found superior in practice. These lower pH values tend to produce rapid hydrolysis of the reagent and therefore the reagent is to be employed as soon as possible, i. e., within a few hours, after acidification and conditions appropriately chosen to reduce the effect of hydrolysis. Fortuitously lower pH values favor rapid separation of the phases.

Increase of the alkyl phosphatic leaching agent in the organic leach phase decreases the amount of uranium stripped by the acidified phosphate phase; therefore, there will be optimum concentrations of such leaching agent determined by consideration of extraction efficiencies required in both the slurried phase and stripping operations. Dilution of the organic leach phase with additional solvent will assist the stripping operation.

Staturated solutions of the reagents used to prepare the stripping reagent occur at low concentrations, e. g., about 0.25 M for $Na_4P_2O_7$. Since maximum stripping occurs with the more concentrated solutions, it is highly desirable, especially in recycle operations to employ acidification methods which do not unnecessarily dilute or contaminate the strip solutions. The method of recovering the uranium involves addition of base (NaOH) until a high pH (above about 11.6) is obtained yielding a uranium precipitate.

For recycle, reacidification is necessary and the effect of repeated recycling is indicated by the following experiments. Saturated $Na_4P_2O_7$ solution was acidified to a pH of 0.6 with concentrated $H_2SO_4$. Portions were then equilibrated with a 5% O.P.A. in kerosene leach containing 5.2 g. of $U_3O_8$ per liter, at organic to aqueous phase ratios of 5 and 4. Uranium was precipitated therefrom with addition of base to attain a pH of 11.6 and the precipitate filtered therefrom. After reacidification the above cycle was repeated several times with the results indicated in the following table:

as Dowex 50, an insoluble sulphonated polystyrene polymer. In this manner dilution of the solution and contamination with sulfate is greatly reduced.

The remarkable effectiveness of the pyrophosphoric acid reagent is indicated by the fact that saturation is approached with a 1 to 1 molecular ratio of uranium to pyrophosphate often resulting in uranium concentrations as high as 40 or more grams per liter in the aqueous phase. Precipitation from the pyrophosphate may be accomplished by neutralization with sodium hydroxide in the presence of sodium bisulfite. In the absence of sodium bisulfite, with ether extract solutions, only a portion of the uranium precipitates due, apparently, to the formation of peroxyuranates derived from peroxide compounds contained in the ether solvent. With other solvents the sodium bisulfite is usually not necessary. Precipitation begins at about a pH of 10 and is complete as the higher pH values are approached. On filtering, washing, and drying a precipitate is obtained which contains mainly uranium oxide and a small amount of phosphate.

Figure 3:
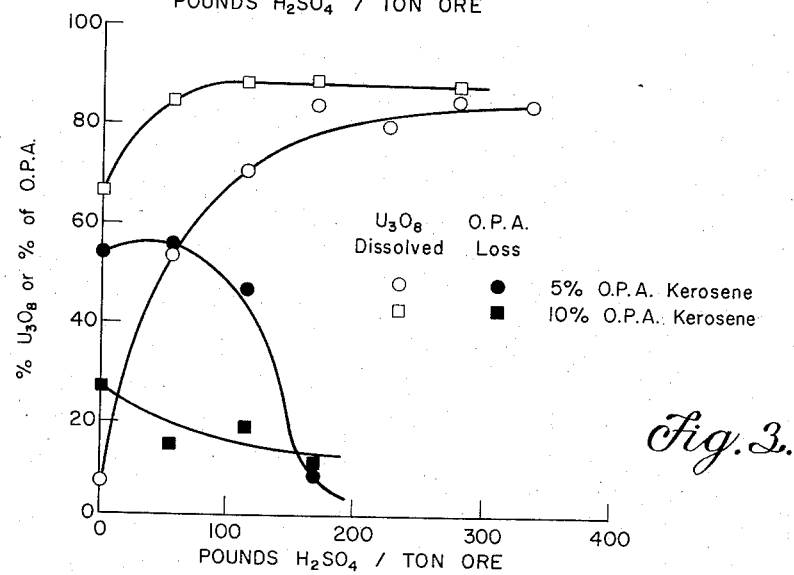
Figure 3 is a graphical illustration of the uranium recovered and octyl phosphoric acid leaching agent loss at two agent concentrations in kerosene as a function of acid consumption in the treatment of carnotite ore.
Figure 4:
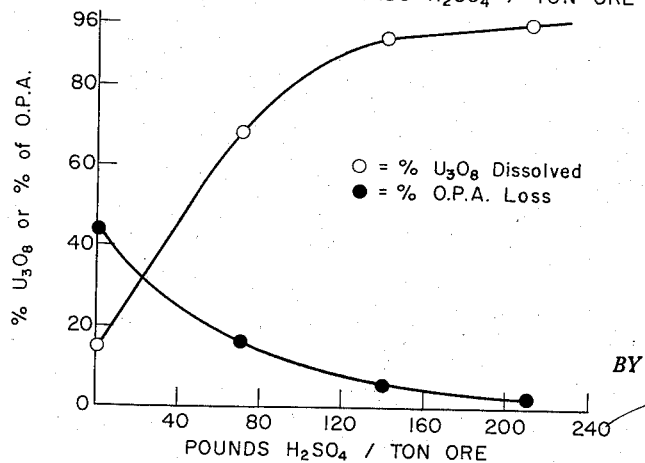
Figure 4 is a graphical illustration of the uranium recovered and octyl phosphoric acid leaching agent loss from an isopropyl ether leach phase as a function of the acid consumption in leaching a carnotite ore.

Further details of the processes of the invention will become apparent in the following description of specific examples of processes operated in accordance with the invention:

EXAMPLE I 25 g. portions of the above disclosed ore were mixed well with various amounts of 96% $H_2SO_4$ and leached directly with 50 ml. O.P.A.-kerosene leaching phase for about 16 hours with the results illustrated in Fig. 3 of the drawing. It may be seen therefrom that a maximum recovery of about 80 to 90% of the uranium is possible and may be obtained with as low as 56 pounds of $H_2SO_4$ per ton of ore with 10% O.P.A. leaching solutions. With 5% O.P.A. leaching solutions about 165 pounds of acid were required per ton of ore. It will also be noted therefrom that considerable O.P.A. is lost particularly with large amounts of acid. Additional experiments run under similar conditions but with isopropyl ether solvents yielded the results illustrated in Fig. 4 of the drawing. It will be noted therefrom that with this solvent uranium recoveries rise to 96%, with 210 pounds $H_2SO_4$ per ton of ore while O.P.A. losses are as low as 2% which is equivalent to less than one pound of O.P.A. per pound $U_3O_8$.

In all of these experiments it has been found by titration of the leaches that as the amount of $H_2SO_4$ is reduced, a loss of acidity in the organic phase is observed. This loss appears to be due to utilization of the acidity of the organic phase in neutralizing basic constituents of the ore. Moreover, it seems that the onset of high O.P.A. losses coincides more or less closely with the loss of titratable secondary hydrogen of the monoalkyl ester present in the leaching agent.

| Cycle No. | Total PO₄ Conc. of H₄P₂O₇ Sol'n, g/l. | Vol. of H₄P₂O₇ Sol'n, ml. | Vol. of 5% O.P.A.-Kerosene, ml. | U₃O₈ in Org., g/l. | U₃O₈ in aq., g/l. | K $\frac{A}{O}$ | U₃O₈ Recy., Percent | U₃O₈ Bal., Percent |
|---|---|---|---|---|---|---|---|---|
| 1 | 41.2 | 10 | 50 | 2.34 | 14.8 | 6.33 | 55 | 102 |
| 1 | 41.2 | 10 | 40 | 1.81 | 13.6 | 7.51 | 65 | 100 |
| 2 | 38.2 | 10 | 50 | 2.95 | 11.2 | 3.80 | 43 | 100 |
| 2 | 38.2 | 10 | 40 | 2.54 | 10.4 | 4.10 | 51 | 99 |
| 3 | 29.8 | 10 | 50 | 3.22 | 8.14 | 2.52 | 38 | 94 |
| 3 | 29.8 | 10 | 40 | 3.28 | 7.52 | 2.29 | 37 | 99 |
| 4 | 21.6 | 10 | 50 | 4.20 | 5.46 | 1.30 | 19 | 102 |
| 4 | 21.6 | 10 | 40 | 3.82 | 5.05 | 1.32 | 27 | 98 |

As may be noted the extraction coefficient declines fivefold, uranium recovery drops twofold coincident with a 50% decline in pyrophosphate recovery. With the values shown multistage treatment of the organic phase would be required for high uranium recoveries.

The above neutralization difficulty is greatly alleviated by acidifying the neutralized solution, at least partially, by contact with an acidified cationic exchange resin such

EXAMPLE II

A series of direct leaching operations were performed on 25 g. samples of the above ore which contained about 0.40% $U_3O_8$ and 0.05% $PO_4$. A leaching phase consisting of 5% O. P. A. in isopropyl ether was added to the finely divided ore in 50 ml. proportions and shaken for various periods of time, separated from the solids, and the residue washed with 100 ml. of solvent to assure complete recovery. In the majority of cases various amounts of $H_2SO_4$, as 96% acid, was added to the ore, mixed as well as possible, and the leaching phase then added. In the last four experiments a variation in this procedure was employed with surprising results, namely, considerably higher uranium recoveries were obtained when the acid was added to the slurry after the leaching phase had been introduced. The effect was particularly noticeable in the case where 48 pounds per ton of the acid was employed. Moreover, leaching agent loss was also reduced. This effect and others, such as the increase of uranium recovery with increase of acid consumed and leaching time, are indicated in the following Table I as well as the conditions under which they were obtained:

TABLE I

| Lbs. $H_2SO_4$ per Ton Ore | Leach Time, Hrs. | Residue Analysis | | $U_3O_8$ Balance, Percent | $U_3O_8$ Dissolved Percent of Head [1] |
|---|---|---|---|---|---|
| | | Percent $U_3O_8$ | Percent $PO_4$ | | |
| 0 | 1 | 0.40 | 0.32 | 109 | 9 |
| 0 | 7 | .40 | .41 | 127 | 27 |
| 48 | ⅓ | .107 | .14 | 113 | 73 |
| 48 | 1 | .086 | .15 | 95 | 78 |
| 48 | 3 | .080 | .16 | 87 | 80 |
| 48 | 7 | .110 | .22 | 74 | 72 |
| 96 | ⅓ | .044 | .11 | 111 | 89 |
| 96 | 1 | .029 | .10 | 79 | 93 |
| 96 | 3 | .039 | .11 | 90 | 90 |
| 96 | 7 | .071 | .17 | 94 | 82 |
| 192 | ⅓ | .064 | .13 | 106 | 84 |
| 192 | 1 | .046 | .11 | 111 | 88 |
| 192 | 3 | .019 | .08 | 101 | 95 |
| 192 | 7 | .034 | .10 | 82 | 92 |
| 48 [2] | 1 | .033 | .042 | 94 | 92 |
| 48 [2] | 7 | .077 | .116 | 89 | 81 |
| 192 [2] | 1 | .042 | .087 | 97 | 89 |
| 192 [2] | 7 | .027 | .089 | 97 | 93 |

[1] Based on residue and ore analyses.
[2] $H_2SO_4$ added after mixing ore with organic solution.

Similar experiments were performed on the above ore using 0.2 M di-O. P. A. (equivalent to 5% O. P. A.) in kerosene or isopropyl ether with the results shown in the following Table II. In this case, the order of addition is of lesser importance; however, generally better results were obtained than with O. P. A. (mixture of mono- and di-octyl).

TABLE II

| Solvent | Lbs. $H_2SO_4$ per Ton Ore | Leach Time, Hrs. | Residue Analysis | | $U_3O_8$ Balance, Percent | $U_3O_8$ Dissolved, Percent of Head [1] |
|---|---|---|---|---|---|---|
| | | | Percent $U_3O_8$ | Percent $PO_4$ | | |
| Ether | [2] 48 | 1 | 0.034 | 0.082 | 97 | 91 |
| Do | [2] 48 | 7 | .029 | .142 | 87 | 93 |
| Do | [2] 192 | 1 | .033 | .028 | 96 | 92 |
| Do | [2] 192 | 7 | .024 | .022 | 96 | 94 |
| Do | 48 | 1 | .033 | .076 | | 92 |
| Do | 48 | 7 | .023 | .065 | | 94 |
| Do | 192 | 1 | .034 | .074 | | 91 |
| Do | 192 | 7 | .019 | .041 | | 95 |
| Do | 0 | 1 | .38 | .26 | 107 | <11 |
| Do | 0 | 7 | .43 | .29 | 113 | <6 |
| Do | 16 | 1 | .27 | .058 | 98 | 42 |
| Do | 16 | 7 | .24 | .068 | 98 | 38 |
| Do | 24 | 1 | .11 | | 100 | 71 |
| Do | 32 | 1 | .032 | .060 | 98 | 92 |
| Do | 32 | 7 | .028 | .40 | 65 | 93 |
| Do | 48 | ¼ | .054 | .092 | 105 | 86 |
| Do | 48 | ½ | .035 | .068 | 97 | 91 |
| Do | 48 | 3 | .030 | .045 | 95 | 92 |
| Kerosene | 48 | 1 | .26 | .48 | | 36 |
| Do | 48 | 7 | .29 | .22 | | 27 |
| Do | 192 | 1 | .038 | .13 | | 90 |
| Do | 192 | 7 | .043 | .035 | | 89 |

[1] Based on residue and ore analyses.
[2] Acid added to dry ore.

Leaching time experiments indicated that about one-half hour was sufficient for uranium recovery but 1 to 2 hours yielded lower leaching agent losses. Also lower losses were obtained with di-O. P. A. than with the normal mixture in kerosene solvent.

Additional acid consumption studies were conducted in a similar fashion and the results obtained with both O. P. A. and di-O. P. A. are illustrated in portions A and B of Fig. 5.

EXAMPLE III

As may be noted from Example II the uranium recoveries can be high, leaching agent losses low and that only about 10% of the leaching agent (di-O. P. A.) is combined with uranium in a batchwise procedure with this particular ore. Accordingly, a 5-stage cascade leaching operation was performed using a 50 ml. portion of 0.2 M di-O. P. A. in isopropyl ether to successively leach five, 25 g. portions of ore, adding the equivalent of 48 lbs. $H_2SO_4$/ton of ore in each stage. Between stages, the original volume of leaching phase was restored with fresh solvent and the solid residue was washed with 100 ml. of the solvent. Results are presented in Table III hereinafter. A progressive drop in recovery is noted; however, appropriate staggered repetition of the operation with fresh leaching phase can be used to recover the uranium in these residues and thereby obtain a generally improved overall recovery.

TABLE III

| Stage | Residue Analysis | | Percent $U_3O_8$ Dissolved [1] | | Wash Composition | |
|---|---|---|---|---|---|---|
| | Percent $U_3O_8$ | Percent $PO_4$ | In Stage | Cumulative | $U_3O_8$ Content, as Percent of that Introduced per Stage | $PO_4$ Content, as Percent of Total $PO_4$ in System |
| 1 | 0.025 | 0.075 | 94 | 94 | 4 | 6 |
| 2 | .052 | .036 | 87 | 90 | 11 | 6 |
| 3 | .075 | .076 | 81 | 87 | 3 | 3 |
| 4 | .15 | .083 | 62 | 81 | 1 | 2 |
| 5 | .21 | .046 | 50 | 75 | 0.4 | 0.5 |

[1] Includes that in washes.

Final filtrate analysis:

| | G./l. |
|---|---|
| $U_3O_8$ | 7.2 |
| $PO_4$ | 20.3 |
| $V_2O_5$ | 0.064 |
| Fe | 0.026 |

EXAMPLE IV

Various diluents (solvents) and leaching agents were evaluated using a standard method in which 25 grams of the above-described carnotite ore were shaken for various periods of time with 50 ml. of leaching phase of various organic phosphoric acid leaches in various solvents and with $H_2SO_4$ added as the 96% acid immediately after mixing of the leaching phase with the ore sample. Each residue was washed with 100 ml. of fresh solvent and the uranium contained in both the leach and wash solution was determined under conditions and with results shown in the following Table I.

TABLE IV

| Solvent | Alkyl Phosphate | Lbs. H2SO4 Ton Ore | Leach Time, Hrs. | Residue Percent U3O8 | Residue Percent PO4 | Percent U3O8 Disolved | U3O8 Bal., Percent |
|---|---|---|---|---|---|---|---|
| Sovasol No. 3 [1] | 0.2 M Di-O.P.A. | 48 | 1 | 0.29 | 0.28 | 28 | 110 |
| CH3OH | 0.2 M Di-O.P.A. | 48 | 1 | 0.12 | 0.28 | 71 | 104 |
| Methyl ethyl Ketone | 0.2 M Di-O.P.A. | 48 | 1 | 0.015 | 0.31 | 96 | 81 |
| Isopropyl ether | 5% Bu P.A. | 48 | 1 | 0.078 | 0.26 | 80 | 94 |
| CH3OH | 5% Bu P.A. | 48 | 1 | .059 | 0.2 | 85 | 55 |
| H2O | 5% Me P.A. | 48 | 1 | .375 | 0.26 | 6 | 105 |
| CH3OH | 5% Me P.A. | 48 | 1 | .063 | 0.39 | 84 | 80 |
| Isopropyl ether | .02 M Di-O.P.A. | 48 | 1 | .32 | .072 | 20 | 93 |
| Do | .02 M Di-O.P.A. | 48 | 7 | .22 | .31 | 45 | 85 |
| Do | 0.05 M | 48 | 7 | .31 | .27 | 22 | 100 |
| Do | 0.10 M | 48 | 1 | .088 | .087 | 78 | 88 |
| Do | 0.10 M | 48 | 7 | .088 | .38 | 78 | 88 |
| Do | 0.40 M | 48 | 1 | .021 | .10 | 95 | 101 |
| Do | 0.40 M | 48 | 7 | .020 | .9 | 95 | 86 |
| Kerosene | 0.2 M Di-O.P.A. | 96 | 1 | .039 | .14 | 90 | 87 |
| Do | 0.2 M Di-O.P.A. | 96 | 7 | .029 | .56 | 93 | 82 |
| Do | 0.2 M Di-O.P.A. | 144 | 1 | .039 | .17 | 90 | 112 |
| Do | 0.2 M Di-O.P.A. | 144 | 7 | .039 | .13 | 90 | 100 |

[1] An aliphatic petroleum fraction boiling about 100° C.

Further experiments were performed under similar conditions using, however, a standard amount of H2SO4, 49.2 lbs./ton of ore and with 5% octyl phosphoric acid in the tested solvent, with the results set forth in the following Table V. The ore originally contained uranium equivalent to 0.35% $U_3O_8$ and 0.08% phosphate. As may be noted from the table, phosphate in excess of this amount appears in the ore residue, which excess represents leaching agent loss.

TABLE V

| Solvent | Residue Percent U3O8 | Residue Percent PO4 | Percent U3O8 Leached | Percent U3O8 Dissolved |
|---|---|---|---|---|
| Isopropyl ether | 0.037 | 0.12 | 91 | |
| Kerosene | 0.110 | 0.51 | 69 | |
| Benzene | 0.079 | 0.31 | 78 | |
| Cyclohexanone | 0.120 | 0.40 | 66 | |
| Sovasol #80 | 0.151 | 0.49 | 57 | |
| Sovasol #140 | 0.223 | 0.76 | 36 | |
| Methyl-ethyl ketone | 0.017 | 0.22 | 95 | |
| Acetone | 0.013 | 0.46 | | 96 plus |
| Methyl isobutyl Ketone | 0.026 | 0.20 | | 93 |
| Methanol | 0.051 | 0.30 | | 86 |
| Sovasol #6 [1] | 0.059 | | | 83 |
| Sovasol #1 | 0.063 | | | 82 |
| Ethanol | 0.072 | 0.34 | | 79 |
| Gasoline | 0.087 | 0.31 | | 75 |
| Heptane | 0.098 | 0.45 | | 72 |
| Xylene | 0.163 | 0.32 | | 54 |
| Toluene | 0.167 | 0.26 | | 52 |

[1] Aliphatic petroleum fraction, B. P. 180-200° C.

From the foregoing and other considerations, ethers, ketones, and alcohols yield the better uranium recoveries with lower acid consumption, aliphatic hydrocarbons including kerosenes and gasoline are intermediate in efficiency, while aromatics seem to yield lower results; however, aromatic hydrocarbons in admixture, e. g., with ketones, yield good results with uranium. The slurries with ethers and ketones are exceptionally easy to filter. While single-stages batch processes could advantageously employ the diluents which yield the higher recoveries, multistages or cascade operations may also operate satisfactorily with the solvents with lower leaching efficiency and other desirable process characteristics may offset the lowered recovery obtained with a particular solvent.

EXAMPLE V

Varying amounts of 5% O. P. A. in isopropyl ether leaching phase were contacted with 25 g. samples of the above carnotite ore which originally contained 0.35% $U_3O_8$ and 0.08% $PO_4$ in order to determine the amount of leaching phase necessary for efficient dissolution of the uranium. It was noted that the 10 ml. volume of leaching phase formed only a mushy mass with the solid material while the remaining volumes were sufficient to obtain a slurry. Each residue was washed with 100 ml. of isopropyl ether to assure complete recovery of the dissolved uranium. Other conditions and the results of these experiments are shown in the following table. It may be noted that the uranium recovery with the 10 ml. portion of leaching phase is low due to the inability of the leaching agent to function properly in the mushy slurry.

| Amount of 5% O. P. A. | Residue Percent U3O8 | Residue Percent PO4 | Percent U3O8 Dissolved |
|---|---|---|---|
| 10 | 0.212 | 0.23 | 40 |
| 20 | 0.131 | 0.20 | 63 |
| 30 | 0.099 | 0.19 | 71 |
| 50 | 0.054 | 0.21 | 85 |

EXAMPLE VI 25 g. ore sample were leached with 5% O. P. P. A. and 5% O. P. A. in isopropyl ether solutions as in Example V, to determine the relative effectiveness as leaching agents. 49.2 lbs. H2SO4/ton of ore was added to the leaching phase which was then contacted with the ore for 1 hour. The O. P. A. leaching phase recovered 90% of uranium while the O. P. P. A. phases recovered 92-93% of the uranium; however, leaching agent losses were higher with O. P. P. A.

EXAMPLE VII

Portions of the above-disclosed carnotite ore were contacted with a 5% solution of n-propyl orthophosphoric acid in isopropyl ether and with H2SO4 added to the slurries in various amounts from zero to 140 pounds per ton of ore. Results of these leaches are indicated in Fig. 6 of the drawing. It may be noted therefrom that the uranium recovery increases rapidly with between 50 and 70 pounds of H2SO4 ton of ore and to decline gradually with additional acid. It will also be noted therefrom that leaching agent losses, as indicated by phosphate content in the residue, pass through a minimum at the point where uranium recovery is highest but tend generally to decrease with increasing amounts of acid, i. e., as compared to small amounts of acid. The losses noted with this leaching agent are considerably higher than those noted with materials prepared with longer chain alkyl substituents.

EXAMPLE VIII

Portions of the above-disclosed carnotite ore were leached with a 5% solution of O. P. P. A. in isopropyl ether. The leaching agent was prepared by adding capryl alcohol to $P_2O_5$ in a 2:1 mole ratio of alcohol to $P_2O_5$ slurried in isopropyl ether yielding about a 20% solution. After cooling the solution was diluted to 5% with isopropyl ether. Eight ore samples of 25 g. size were leached with 50 ml. of the solution and with various quantities of $H_2SO_4$ added to the slurry yielding the results illustrated in Fig. 7 of the drawing. The illustrated results are very similar to those obtained with 5% O. P. A. in isopropyl ether except that in this case the uranium recovery is generally about 3–5% greater. The lowered recovery in the last two points shown in the figure is due to the solubility of the leaching agent in the relatively large amounts of acid phase present in the slurry.

EXAMPLE IX

A series of leaches were performed with both 1% and 5% O. P. A. in methyl ethyl ketone on portions of the above carnotite ore and with $H_2SO_4$ in amounts of from zero to 140 pounds per ton of ore. Results of these leaches are illustrated in Fig. 8 of the drawing. It will be noted therefrom that there is an abrupt rise from less than 20% recovery of the uranium, when no $H_2SO_4$ is added, to astonishingly higher recoveries with only small quantities of acid and with either concentration of extractant. The particular combination of solvent, acid, and leaching agent described herein yields optimum results as concluded following extensive experience with this type of operation.

EXAMPLE X

Samples of the above carnotite ore were leached with constant volumes of a 5% O. P. A. solution in a mixed diluent formed of kerosene and methyl ethyl ketone in varying proportions. A constant amount of $H_2SO_4$, equivalent to 49.2 pounds per ton of ore and with a one hour shaking period resulted in uranium recoveries and phosphate losses illustrated in Fig. 9 of the drawing. It will be noted that the uranium recovery is at a maximum with methyl ethyl ketone alone; however, with proportions of more than 40% of the ketone in the kerosene the recoveries are excellent. With the 5, 10, and 20% methyl ethyl ketone solutions the slurries were gummy and difficult to filter. Apparently with these proportions of leaching phase, the leaching agent was occluded yielding the low recoveries and large losses indicated in the drawing.

EXAMPLE XI

A series of simulated countercurrent leaches were performed in the manner described in the "Chemical Engineer's Handbook," John H. Perry, 1941, at pp. 1219–20. A 5% solution of O. P. A. in methyl ethyl ketone, to which was added $H_2SO_4$ equivalent to 49.2 pounds per ton of the above carnotite ore, was utilized as the leaching phase. A three stage system of leaching using 25 g. of ore and 50 ml. of leach phase was utilized. The ore in stage number 1 was contacted with a leach solution previously used to leach two batches of the ore, the ore in stage number two having been subjected to one previous leaching operation and was leached with a leach phase used with one previous batch and the ore in stage three had been leached twice previously and was leached with fresh leaching phase. Ore leaving the system was washed thoroughly with methyl ethyl ketone to assure complete recovery. Results appear in the following table:

Original ore: 0.350%, $U_3O_8$; 0.08%, $PO_4$

| Stages of Ore Leaches | Residue | | Percent $U_3O_8$ Dissolved | Total Percent $U_3O_8$ Bal. for System |
|---|---|---|---|---|
| | Percent $U_3O_8$ | Percent $PO_4$ | | |
| 1 | 0.148 | 0.68 | 57.8 | |
| 2 | 0.006 | 0.16 | 98.3 | 92 |
| 3 | 0.005 | 0.13 | 98.6 | |

From the tabulated data, it is apparent that only two stage leaching is necessary to yield a very good uranium recovery and that little is to be gained by using the third stage. The leaching agent loss after the first stage drops to a low value and it is noted that these countercurrent leaches are more effective than single stage direct leaching of the ore.

EXAMPLE XII

Twenty-five gram samples of the above carnotite ore were leached with 50 ml. portions of 5% O. P. A. in methyl ethyl ketone with $H_2SO_4$ equivalent to 49.2 pounds per ton of ore added to the slurry before leaching. Each successive sample was leached for one hour and filtered and the filtrate made up to 50 ml. with methyl ethyl ketone to assure complete recovery of uranium. Data obtained by this multistage leaching method using a reconstituted extract is shown in the following table:

Ore: 0.350% $U_3O_8$; 0.080% $PO_4$

| Stage | Residue | | Percent $U_3O_8$ Dissolved [1] | |
|---|---|---|---|---|
| | Percent $U_3O_8$ | Percent $PO_4$ | Per Stage | Cumulative |
| 1 | 0.009 | 0.20 | 97.5 | 97.5 |
| 2 | 0.028 | 0.24 | 92.0 | 94.7 |
| 3 | 0.046 | 0.19 | 86.9 | 92.1 |
| 4 | 0.050 | 0.16 | 85.8 | 90.5 |
| 5 | 0.063 | 0.14 | 82.0 | 88.8 |

[1] Includes uranium contained in wash.

EXAMPLE XIII

Twenty-five gram samples of the above-described carnotite ore were leached for 1 hour with 10, 20, 30, 40, and 50 ml. portions of a 5% solution of O. P. A. in methyl ethyl ketone. $H_2SO_4$ equivalent to 49.2 pounds per ton of ore was added to each slurry at the beginning of the operation. Since 10 ml. of leaching phase formed a thick paste and could not be filtered the leached slurry was washed with methyl ethyl ketone to remove the leach solution. Originally the ore contained uranium equivalent to 0.390% of $U_3O_8$ and phosphate equivalent to 0.08% and the decrease of $U_3O_8$ and increase of phosphate in the ore indicates recovery of U and loss of leach agent respectively. Results of these leaches appear in the following table:

| 5% O. P. A., ml. | Residue | | Percent $U_3O_8$ Dissolved [1] |
|---|---|---|---|
| | Percent $U_3O_8$ | Percent $PO_4$ | |
| 10 | 0.056 | 0.14 | 85.7 |
| 20 | 0.032 | 0.15 | 91.9 |
| 30 | 0.029 | 0.21 | 92.6 |
| 40 | 0.022 | 0.29 | 94.4 |
| 50 | 0.013 | 0.19 | 96.7 |

[1] Includes $U_3O_8$ contained in wash.

The above experiment was repeated exactly with the exception that 1% O. P. A. in methyl ethyl ketone was used. This leaching agent was prepared as disclosed in one of the aforesaid copending applications by adding capryl alcohol to a slurry of $P_2O_5$ in methyl ethyl ketone at a ratio of 2 moles of alcohol per mole of $P_2O_5$. The preparation was diluted to 1% with methyl ethyl ketone and employed in the leaching operation. The original ore contained 0.35% and 0.08% $PO_4$; results obtained appear in the following table:

| 1% O. P. P. A., ml. | Residue | | Percent $U_3O_8$ Dissolved [1] |
|---|---|---|---|
| | Percent $U_3O_8$ | Percent $PO_4$ | |
| 10 | 0.150 | 0.16 | 56.8 |
| 20 | 0.103 | 0.24 | 70.4 |
| 30 | 0.062 | 0.23 | 82.2 |
| 40 | 0.048 | 0.21 | 86.2 |
| 50 | 0.044 | 0.31 | 85.4 |

[1] Included $U_3O_8$ in wash.

In order to further elucidate the role which acid performs in this type of extraction, various amounts of $H_2SO_4$ at three phase ratios were added to a slurry in contact with a leaching phase comprising 5% O. P. A. in methyl ethyl ketone. The purpose of this investigation was to determine whether the typical inflection which is obtained in acid-uranium recovery curves was a function of the amount of solvent used in the leach. Twenty-five gram samples of ore were leached with 25, 50, and 100 ml. of leaching phase together with amounts of from 0 to 140 pounds of $H_2SO_4$ per ton of ore. Results of these leaches are plotted in Fig. 10 of the drawing.

Inspection of Fig. 10 will indicate that in each case the acid consumption levels off in the region of 20 pounds per ton of ore. This data further indicates that the results are completely independent of the amount of solvent used in these experiments in contrast to results obtained with low concentrations of $H_2SO_4$ (less than 15 pounds per ton of ore) wherein significantly higher recoveries seem to be obtained with a lesser volume, i. e., 25 ml. of solvent, than with larger amounts. With larger concentrations of $H_2SO_4$, however, about the same recovery is obtained regardless of phase ratio.

EXAMPLE XIV

Slurry leaches were made in which various quantities of 70% $HNO_3$ were added to a slurry of 25 grams of the above-disclosed carnotite ore and 50 ml. of 5% O. P. A. in isopropyl ether. Similar extractions were made using 37% HCl with the data obtained with these experiments being plotted in Fig. 11 of the drawing. For simplicity of comparison the amounts of $HNO_3$ and HCl are expressed in terms about equivalent to $H_2SO_4$ utilized in preceding examples. It will be noted therefrom that the amount of uranium recovered was considerably less than when $H_2SO_4$ was added to the slurry. The curves of $HNO_3$ and HCl show a maximum at about 30 pounds equivalent $H_2SO_4$ and a minimum at about 60 pounds equivalent per ton of ore for which peculiar behavior no reason is apparent.

EXAMPLE XV

A countercurrent leach of a slurry of the above-disclosed carnotite ore was performed with a 1% solution of O. P. A. in methyl ethyl ketone using a ratio of solvent volume to ore weight of 0.8. $H_2SO_4$ equivalent to 49.2 pounds/ton of ore was added to the leaching phase as it entered the system. The ore was washed with 100 ml. of methyl ethyl ketone as it left the system, which consisted of three stages. The ore orginially contained 0.376% $U_3O_8$ and 0.08% $PO_4$ from which the uranium was recovered and phosphatic leaching agent lost as indicated in the following table:

| Stage No. of contacts of ore with leach | Residue | | Percent $U_3O_8$ Dissolved |
|---|---|---|---|
| | Percent $U_3O_8$ | Percent $PO_4$ | |
| 1 | 0.288 | 0.19 | 23.4 |
| 2 | 0.098 | 0.11 | 74.0 |
| 3 | 0.044 | 0.10 | 88.3 |

These results indicate that efficient uranium recoveries can be obtained with such a dilute leach solution and, as compared with other results, considerable economy in the consumption of O. P. A. may be obtained by the use of this dilute leaching agent, i. e., use of dilute leach solutions tends to reduce loss of leaching agent.

EXAMPLE XVI

Percolation leaching of portions of the above disclosed ore were performed utilizing a 25 g. sample of ore disposed in a glass column closed at the lower end with a coarse glass frit. 100 ml. of a 5% solution of O. P. A. in methyl ethyl ketone containing 0.61 gram of concentrated $H_2SO_4$ (equivalent to approximately 50 pounds/ton of ore) was passed through the ore in the column. Samples were taken as each 10 ml. portion passed through the column and the ore was washed finally with 100 ml. methyl ethyl ketone. The leaching curves for uranium, iron, and vanadium are illustrated in Fig. 12 of the drawing. The foregoing experiment was repeated in an identical fashion; however 1% O. P. A. leaching solution was employed. In this and the previous experiment the bed depth was 5 cm. and the flow rate was approximately 1 ml. per minute in a glass column of a diameter of 2.2 cm. Results of this latter extraction are shown in Fig. 13 of the drawing.

EXAMPLE XVII

A single portion of O. P. A. in methyl ethyl ketone was used to leach ten successive samples of the above-described carnotite ore with no make up between stages. In each stage the leach solution was added to the ore together with $H_2SO_4$ equivalent to about 50 pounds per ton of ore and the slurry mixture was shaken for one hour and filtered. The methyl ethyl ketone leach liquor was restored to its original volume by the addition of solvent prior to each of the last nine stages of operation. Results of this multiple stage leaching of the ore which originally contained 0.380% $U_3O_8$ and 0.080% $PO_4$ are shown in the following table. Methyl ethyl ketone was used to wash residual leach solution from the leached residues:

| No. of Cycles | Residue | | Percent $U_3O_8$ Dissolved [1] | |
|---|---|---|---|---|
| | Percent $U_3O_8$ | Percent $PO_4$ | Per Stage [1] | Cumulative |
| 1 | 0.10 | 0.16 | 97.4 | 97.4 |
| 2 | 0.015 | 0.10 | 96.1 | 96.7 |
| 3 | 0.040 | 0.17 | 89.5 | 94.3 |
| 4 | 0.059 | 0.13 | 84.5 | 91.8 |
| 5 | 0.065 | 0.13 | 82.9 | 90.0 |
| 6 | 0.089 | 0.13 | 76.6 | 87.8 |
| 7 | 0.117 | 0.12 | 69.2 | 85.2 |
| 8 | 0.132 | 0.11 | 65.2 | 82.7 |
| 9 | 0.178 | 0.11 | 53.2 | 79.3 |
| 10 | 0.219 | 0.17 | 42.4 | 75.6 |

[1] Includes $U_3O_8$ contained in wash.

Final analysis of the filtrates:

| | G./l. |
|---|---|
| Fe | 0.31 |
| $V_2O_5$ | 0.80 |
| Al | 0.24 |
| Ca | 1.06 |
| $PO_4$ | 4.34 |

It will be noted that the leach agent can be reused a number of times to recover high percentages of the uranium from successive leaches. The other metals noted build up to some extent although not as much as the uranium. Even after ten uses, note that more than 40% of the uranium is still leached. These circumstances clearly indicate that appropriate cascade arrangements of the leaching procedure would afford considerable economies of the leach agent and very efficient recovery of uranium.

While in the foregoing there has been described what may be considered to be preferred embodiments of the invention, modifications may be made therein within the skill of the art and it is intended to cover all such as fall within the scope of the appended claims.

What is claimed is:

1. In a process for recoving uranium values from a high-lime carnotite solid material, the step comprising contacting the solid material with an organic phosphatic leaching agent selected from the group consisting of alkyl phosphoric acids, alkyl pyrophosphoric acids, alkyl phosphites and alkyl phosphonates in the presence of a concentrated mineral acid to react with said material and solubilize the uranium wherein the solid material and mineral acid remain as a single wetted solid phase, and whereby said metal value is leached by said agent.

2. In a process for recovering uranium values from a high-lime carnotite solid material, the steps comprising contacting the solid material dispersed in a finely divided state and wherein said material is reacted with concentrated mineral acid to solubilize the uranium and the solid material and mineral acid remain as a single wetted solid phase with an organic leaching phase including a material selected from the group consisting of alkyl phosphoric acids, alkyl pyrophosphoric acids, alkyl phosphites and alkyl phosphonates dissolved in an organic diluent forming a slurried admixture, whereby said metal value is leached by said organic phase, separating the leach phase from the slurry, and recovering the metal value from the leach phase.

3. In a process for recovering uranium from a high-lime carnotite ore, the steps comprising pulverizing the ore, adding and mixing a concentrated mineral acid to react with the ore while the ore and added mineral acid remain as a single wetted solid phase, then contacting the acidified ore with an organic leach phase including a material selected from the group consisting of alkyl phosphoric acids, alkyl pyrophosphoric acids, alkyl phosphites and alkyl phosphonates dissolved in an organic diluent forming a slurried mixture, whereby said uranium value is leached into the organic phase, separating the leach phase from the slurried mixture, and recovering the uranium value from the leach phase.

4. In a process for recovering uranium values from a high-lime carnotite ore, the steps comprising pulverizing the ore, contacting the pulverized ore with an organic leach phase including a material selected from a group consisting of alkyl phosphoric acids, alkyl pyrophosphoric acids, alkyl phosphites and alkyl phosphonates dissolved in an organic diluent forming a slurried mixture, then adding a concentrated mineral acid to the slurried mixture shortly thereafter to react with said ore and solubilize the uranium values while the ore and mineral acid remain as a single solid phase in contact with the organic leach phase, whereby said uranium values are leached by the organic phase, separating the leach phase from the slurry, and recovering the uranium values from the leach phase.

5. In a process for recovering uranium values from a high-lime carnotite ore, the steps comprising pulverizing the ore, then contacting the ore simultaneously with concentrated mineral acid and an organic leach phase including a material selected from the group consisting of alkyl phosphoric acids, alkyl pyrophosphoric acids, alkyl phosphites, and alkyl phosphonates dissolved in an organic diluent forming a slurry mixture wherein the ore and mineral acid form a single wetted solid phase and the organic leach forms a second liquid phase, whereby the acid reacts with the ore to solubilize the uranium and the uranium is leached into the organic phase, separating the leach phase from the slurry, and recovering uranium values from the leach phase.

6. The process as defined in claim 5 wherein said concentrated mineral acid comprises $H_2SO_4$.

7. The process as defined in claim 5 wherein said concentrated mineral acid comprises HCl.

8. The process as defined in claim 5 wherein said concentrated mineral acid comprises $HNO_3$.

9. The process as otherwise described in claim 3 but wherein said mineral acid comprises a material selected from the group consisting of $H_2SO_4$, HCl and $HNO_3$ and said organic diluent comprises a material selected from the group consisting of ethers, ketones, alcohols, petroleum hydrocarbons and aliphatic hydrocarbons.

10. The process as otherwise described in claim 4 but wherein said mineral acid comprises a material selected from the group consisting of $H_2SO_4$, HCl and $HNO_3$ and said organic diluent comprises a material selected from the group consisting of ethers, ketones, alcohols, petroleum hydrocarbons and aliphatic hydrocarbons.

11. The process as otherwise described in claim 5 but wherein said mineral acid comprises a material selected from the group consisting of $H_2SO_4$, HCl and $HNO_3$ and said organic diluent comprises a material selected from the group consisting of ethers, ketones, alcohols, petroleum hydrocarbons and aliphatic hydrocarbons.

12. In a process for recovering uranium values from a high-lime carnotite ore, the steps comprising pulverizing the ore, adding an organic leaching phase including an alkyl phosphatic leaching agent and an organic diluent to the pulverized ore to form a slurry and shortly thereafter adding concentrated $H_2SO_4$ to the slurry to react with the uranium in said ore and in amounts wherein the ore and acid form a single wetted solid phase, whereby the uranium values are dissolved by the leaching phase, separating the leach phase from the slurry, and recovering the uranium from the leach phase.

13. In a process for recovering uranium values from a high-lime carnotite ore, the steps comprising contacting said ore with an organic leaching phase including an alkyl phosphatic leaching agent dissolved in an organic diluent forming a slurry in the presence of a mineral acid solubilizing agent which reacts with said ore and forms a single wetted solid phase, whereby the uranium values are dissolved by the leach phase, separating the leach phase from the slurry, treating the leach phase with dilute aqueous HF in the presence of a reducing agent to precipitate uranium fluoride therefrom, and separating the precipitate from the leach phase.

14. In a process for recovering uranium values from a high-lime carnotite ore, the steps comprising contacting said ore with an organic leaching phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, separating the leaching phase from the slurry, treating the leach phase with a basic material to precipitate the uranium values therefrom, and separating the precipitated uranium from the leach phase.

15. In a process for recovering uranium values from a high-lime carnotite ore, the steps comprising contacting said ore with an organic leaching phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, contacting the leach phase with an aqueous reagent solution, whereby the uranium is extracted in said aqueous solution, separating the aqueous solution and leach phase, and drying and calcining the aqueous solution to yield a solid uranium product.

16. In a process for recovering uranium values from a high-lime carnotite ore, the steps comprising contacting said ore with an organic leach phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, contacting the leach phase with an aqueous solution of oxalic acid, whereby the uranium is extracted into said aqueous solution, separating the aqueous oxalic solution and leach phase, and precipitating uranium from the aqueous oxalic acid solution.

17. In a process for recovering uranium values from a carnotite ore, the steps comprising contacting said ore with an organic leaching phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leach phase, contacting the leach phase with an aqueous solution of HF in the range of about 3 to 5% concentration, whereby the uranium is extracted into said aqueous solution, separating the aqueous solution and leach phase, and treating the aqueous phase with a reducing agent to precipitate uranous fluoride therefrom.

18. In a process for recovering uranium values from a high-lime carnotite ore, the steps comprising contacting said ore with an organic leach phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leach phase, contacting the leach phase with an aqueous solution of a pyrophosphate salt, whereby the uranium is extracted into said aqueous solution, separating the aqueous solution and leach phase, and neutralizing the aqueous phase to precipitate the uranium therefrom.

19. The process as defined in claim 18 but wherein said organic diluent comprises an ether and the aqueous phase is neutralized in the presence of sodium bisulfite.

20. In a process for recovering uranium values from a high-lime carnotite ore, the steps comprising contacting said ore with an organic leach phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leach phase, separating the leach phase from the slurry, adding alcohol selected from the group consisting of methyl and ethyl alcohols to the leach phase to precipitate the uranium, and separating the precipitate from the fluid phases.

21. In a process for recovering uranium values from a high-lime carnotite ore, the steps comprising contacting said ore with an organic leach phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, separating the leach phase from the slurry, contacting the leach phase with HCl of above about 11 M concentration to extract the uranium therein, and recovering the uranium from the HCl phase.

22. In a process for recovering uranium values from a high-lime carnotite ore, the steps comprising contacting said ore with an organic leaching phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, separating the leach phase from the slurry, contacting the leach phase with HCl of above about 11 M concentration to extract the uranium therein, contacting the HCl phase with a strongly basic anionic exchange resin to adsorb the uranium thereon, eluting the uranium from the resin with water, and recovering the uranium from the eluate obtained in the foregoing operation.

23. In a process for recovering uranium values from a high-lime carnotite ore, the steps comprising contacting said ore with an organic leaching phase including an alkyl phosphatic leaching agent dissolved in an organic diluent forming a slurried mixture in the presence of a mineral acid solubilizing agent which reacts with said ore and forms a single wetted solid phase, whereby the uranium values are dissolved by the leaching phase, separating the leach phase from the slurry, contacting the leach phase with HCl of above about 11 M concentration to extract the uranium therein, and distilling the HCl from the HCl to leave the uranium as a residue.

24. In a process for recovering uranium values from a high-lime carnotite ore, the steps comprising contacting said ore with an organic leach phase including an alkyl phosphate leaching agent dissolved in an organic diluent forming a slurried mixture in the presence of a mineral acid solubilizing agent which reacts with said ore and wherein the acid and ore form a single wetted solid phase, whereby the uranium values are dissolved by the leach phase, contacting the leach phase with an aqueous solution of a polyphosphate salt whereby the uranium is extracted into said aqueous solution, separating the aqueous solution and leach phase, and neutralizing the aqueous phase to precipitate the uranium therefrom.

25. The process defined in claim 24 but wherein said organic diluent comprises an ether and the aqueous phase is neutralized in the presence of sodium bisulfite.

26. In a process for recovering uranium values from a high-lime carnotite ore, the steps comprising contacting said ore with an organic leaching phase including an alkyl phosphate leaching agent dissolved in an organic diluent forming a slurried mixture in the presence of a mineral acid solubilizing agent which reacts with said ore and wherein the acid and ore form a single wetted solid phase, whereby the uranium values are dissolved by the leaching phase, separating the leach phase from the slurry, producing an acidified solution of $Na_6P_4O_{13}$, contacting said acidified solution with the leach phase to strip uranium therefrom, and precipitating the uranium from the strip solution by neutralizing with base.

References Cited in the file of this patent

UNITED STATES PATENTS 2,769,686     McCullough et al.        Nov. 6, 1956

OTHER REFERENCES

Atomic Energy Commission document DOW-72, Mar. 3, 1952. (Copy available from Atomic Energy Commission.)

Atomic Energy Commission document DOW-84, Sept. 12, 1952. (Copy available from Atomic Energy Commission.)

ISC-612, Atomic Energy Commission Document, June 1955, pp. IV, V, 23, 24.